Dec. 11, 1934.　　　C. W. CLARK ET AL　　　1,983,932
THEFT ALARM FOR AUTOMOBILES
Filed May 2, 1930　　2 Sheets-Sheet 1

Inventors
Richard Rupert,
Charles W. Clark.
By A. J. O'Brien
Attorney

Dec. 11, 1934.      C. W. CLARK ET AL      1,983,932

THEFT ALARM FOR AUTOMOBILES

Filed May 2, 1930      2 Sheets-Sheet 2

Inventors
Richard Rupert,
Charles W. Clark.
By A. J. O'Brien
Attorney

Patented Dec. 11, 1934

1,983,932

UNITED STATES PATENT OFFICE 1,983,932

THEFT ALARM FOR AUTOMOBILES

Charles W. Clark, Denver, Colo., and Richard Rupert, Kansas City, Mo., assignors to The Electric Alarm Co., Inc., Denver, Colo., a corporation of Colorado Application May 2, 1930, Serial No. 449,281

2 Claims. (Cl. 200—90)

This invention relates to improvements in theft alarms and has reference more particularly to a switch mechanism that can be attached to an automobile or to a floor or any other support and which will cause a signal control switch to function for the purpose of interrupting a signal circuit whenever the support to which the device is attached is disturbed, or vibrated.

The device to which this invention relates is suitable for use in many places, but is especially well adapted for use on automobiles for the purpose of sounding an alarm if an unauthorized person disturbs the automobile and which will continue to sound an audible alarm as long as the disturbance continues.

The theft of automobiles has assumed an alarming proportion and even where automobiles are locked in the usual way, a professional thief has no difficulty in circumventing the lock and removing the automobile under its own power.

The object of this invention is to produce a theft protective circuit closing and interrupting device that can be readily attached to an automobile and which will give an alarm that will call attention to the fact that the automobile is being interfered with or operated by an unauthorized person.

Another object of this invention is to produce a simple device of the class described which shall be free from pawls and ratchets, gears or other complicated mechanism and which will therefore be very unlikely to get out of order and which, for this reason, will be highly reliable.

The above and other objects that may become apparent as this description proceeds are attained by means of a construction and an arrangement of parts that will now be described in detail, reference for this purpose being had to the accompanying drawings in which the preferred embodiment of the invention has been illustrated, and in which.

Figure 1:
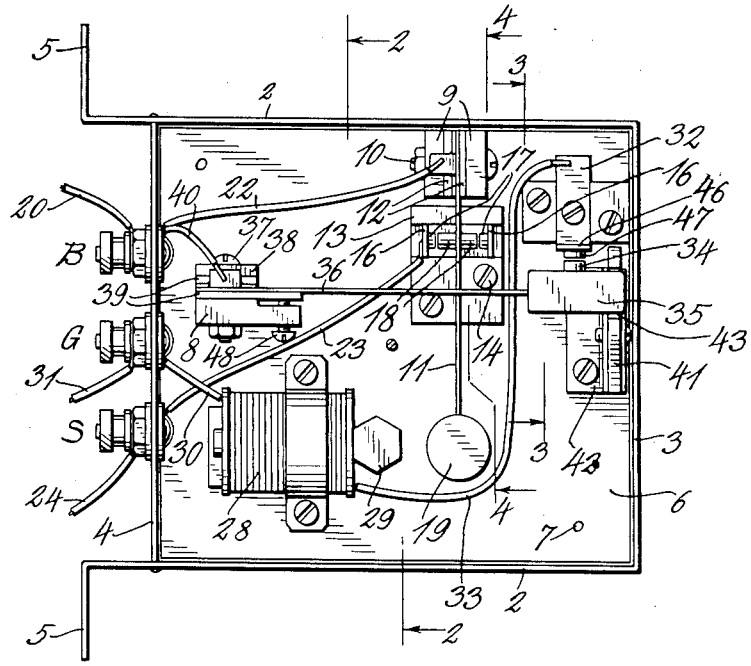
Fig. 1 is a top plan view of the improved alarm mechanism.
Figure 2:
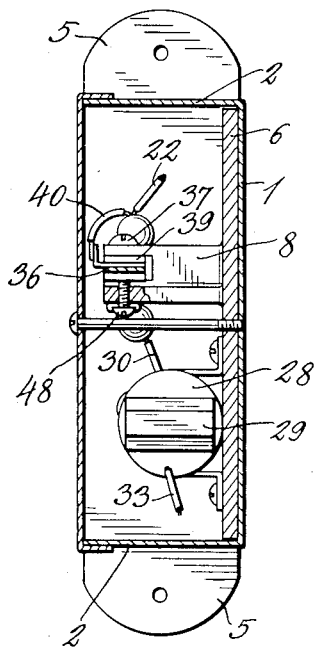
Fig. 2 is a section taken on line 2—2, Fig. 1.
Figure 3:
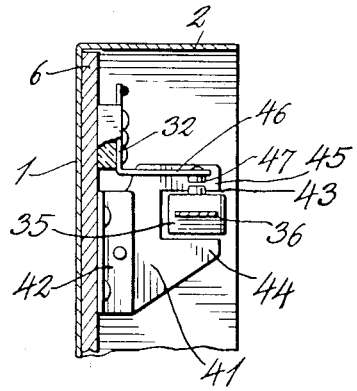
Fig. 3 is a section taken on line 3—3, Fig. 1.
Figure 4:
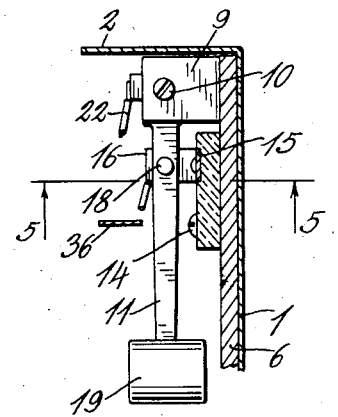
Fig. 4 is a section taken on line 4—4, Fig. 1.
Figure 5:
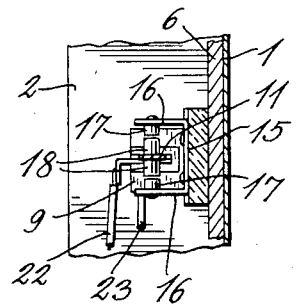
Fig. 5 is a section taken on line 5—5, Fig. 4.
Figure 6:
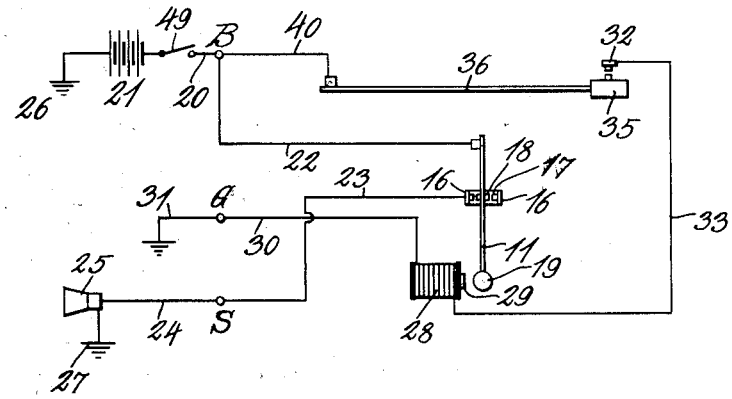
Fig. 6 is a diagram showing the manner in which the various parts are related to each other and electrically connected with each other.

In the drawings reference numeral 1 represents the bottom of a metal box or casing having sides 2 and end members 3 and 4 and supporting brackets 5 that are formed by extensions of the sides 2 in the manner shown in Fig. 1. Located within the casing is a supporting base 6, which may be of any suitable material and which in the form illustrated is cast from brass. This base carries the several parts of the mechanism and is itself secured to the bottom 1 by screws or rivets 7. The base is provided with two lugs 8 and 9 that are integral with it and extend upwardly therefrom. The lug 9 is made in two parts and is perforated for the reception of clamping screw 10. A pendulum 11 which is formed from a flat spring has its upper end located between the two parts of lug 9 and insulated from the latter by means of insulating material 12. By tightening the screw 10 the upper end of the pendulum is firmly clamped into position between the two parts of this lug. A small base 13 of insulating material is secured to base 6 by means of screws 14. Secured to the upper surface of base 13 is a U-shaped contact 15 having two parallel upwardly extending side members 16, each of which is provided on its inner surface with a contact 17. The two contacts are spaced apart and are located equal distances from the sides of the pendulum 11, when the latter is in normal position. Secured to the pendulum is a contact 18 that is somewhat shorter than the distance between the two contacts 17, and which, therefore does not come in contact with either of them when the pendulum is in normal position. Secured to the free end of the pendulum is a weight 19 which is preferably made from soft iron and which should be quite heavy so as to decrease the period of vibration of the pendulum. When the pendulum vibrates contact 18 will alternately engage the two contacts 17 in a manner quite apparent from the drawings. Secured to the side 4 are three binding posts B, G and S that are insulated from the casing. A conductor 20 extends from binding post B to a battery 21 and a conductor 22 extends from this binding post to the pendulum 11 as shown in Fig. 1. The U-shaped contact 15 is connected by means of a conductor 23 to the binding post S and from this the conductor 24 extends to the horn 25 or other audible signal. One pole of the battery is grounded at 26 and one terminal of the horn is grounded at 27. It is now apparent that when the pendulum vibrates with sufficient amplitude to make the contact 18 engage contacts 17, a current will flow from the battery to the horn every time that one of the contacts 17 is engaged by the contact 18.

For the purpose of initiating the vibration of the pendulum, we have provided an electromagnet 28 that is provided with a pole piece 29 located a short distance from the magnetic weight 19. This magnet is provided with a winding one end of which is connected to the binding post G by means of a conductor 30, binding post G being grounded through a conductor 31. The other end of the winding is connected to one terminal 32 of a theft protective switch by means of a conductor 33. The other terminal of the theft protective switch has been designated by reference numeral 34 and is carried by a weight 35 secured to the free end of a spring 36 whose other end is fastened to the lug 8 in a manner which will now be described. Lug 8 is provided with an opening for the reception of a clamping screw 37 and this screw passes through a block 38 and through the lug 8 in the manner shown in the drawings. Spring 36 is insulated from lug 8 and from the block 38 by means of two insulating plates 39. A conductor 40 extends from spring 36 to binding post B. The spring 36 is sufficiently strong to support the weight 35 when the parts are supported in such position that the weight 35 is located beneath the contact 47 as shown in Fig. 1. A stop 41 is secured to the base by means of a bracket 42. This stop has a notch or opening 43 that is somewhat wider than the thickness of the weight 35 and the latter projects into this opening. The part 44 that is located beneath the weight 35 limits its downward movement, while part 45 serves as a stop against excessive upward movement of the weight. Member 41 is preferably made from rubber which is vulcanized so as to be resilient as distinguished from hard rubber, and therefore it will yield slightly when the weight strikes the sides of the notch. The switch contact 32 has an upwardly extending arm 46 that carries the contact point 47 and since the arm 46 is made from resilient material, it can yield slightly when the contact 43 is brought into engagement with it. The position of the weight 35 can be adjusted by means of a screw 48 that is threadedly connected with lug 8 and extends upwardly into engagement with the lower surface of the insulating block 39. By turning this screw so as to move it upwardly, the position of weight 35 is raised, and the sensitiveness of the theft protective switch which comprises contacts 34 and 47, can, therefore, be adjusted by means of screw 48. Since the spring 36 is connected with the battery and since the electromagnet is connected in series between the ground and the switch contact 32, it is evident that when the contact 34 is brought into engagement with contact 47, a circuit will be established that will permit an electric current to flow from the battery through the electromagnet and to the ground. As soon as the electromagnet is energized, it will attract the weight 19 and pull it over against the pole piece 29. As soon as the contact 34 moves away from contact 47, the electromagnet becomes deenergized and releases the weight 19 which is therefore quickly pulled away by the action of spring 11 and since the weight 19 is quite heavy in comparison with the strength of the spring, the pendulum will be set into vibration and this will bring the contact 18 into engagement with contacts 17, thereby periodically closing the circuit to the horn which will give an audible alarm. Unless the electromagnet is again energized within a short time the pendulum will decrease its amplitude of vibration to such an extent that the circuit to the horn will not be closed and a short time after this the pendulum will come to rest. It will be seen from the above, that when the support to which the casing is secured is disturbed or vibrated sufficiently to cause the inertia operated theft protective switch to move into circuit closing position, the electromagnet will become energized and start the pendulum to vibrate, and this in turn will make and break the circuit to the audible signal which will sound an alarm. If the car or other object to which the casing is supported continues to vibrate, the electromagnet will be energized each time the theft protective switch is closed, and the alarm will therefore be sounded periodically until the disturbance ceases.

If the battery were connected at all times to the binding post, it is evident that the alarm would be operating whenever the automobile was in motion. To prevent this a switch 49 is introduced in the conductor 20 and this switch may be located underneath the upholstery or in some secret place so that it can only be operated by some one familiar with its location, or it may be a key operated switch located on the instrument board and in which case the switch can only be opened by some one possessing the proper key.

Particular attention is called to the fact that in the embodiment described and shown, there are no gears, ratchets or other movable parts that are likely to get out of order, as the only movable parts of this device are the pendulum and the weight 35 of the theft protective switch, since these parts merely vibrate, they are not likely to readily get out of order, and since their construction is very simple, the cost of manufacturing and assembling this device, is low compared to devices for a similar purpose that have a large number of delicate parts.

Having described the invention what is claimed as new is:

1. A device for controlling the operation of an electric circuit, comprising, in combination, a base, an electromagnet secured thereto, a pendulum having its upper end attached to the base and having its lower end provided with a weight, the pendulum being formed in part by a strip of resilient material and normally held in a predetermined position by the action of the resilient strip, the upper end of the strip being rigidly attached to the base so that it must flex when the weight is moved, a switch contact carried by the pendulum, another switch contact carried by the base, the two contacts being normally out of contact but so positioned and spaced that they will engage for the purpose of closing an electric circuit, when the pendulum is vibrated beyond a certain amplitude, a portion of the pendulum being of magnetic material and serves as an armature, the electromagnet having a pole piece, the distance between the armature and the pole piece being sufficient to permit the pendulum to vibrate with sufficient amplitude to bring the electric contacts into circuit making position, the electromagnet when energized exerting a force on the armature which flexes the resilient portion thereof, whereby when the electromagnet is deenergized the pendulum will begin to vibrate, thereby closing and opening the electric circuit controlled by the contacts.

2. A circuit interrupter comprising, in combination, a stationary supporting bracket, a pendulum comprising a thin flat spring having one end rigidly clamped to the bracket and normally projecting downwardly therefrom, the lower end of the spring having a weight of magnetic material carried thereby, the pendulum having an electric contact, an electric contact stationary with respect to the bracket and spaced from the contact on the pendulum such a distance that the two contacts will function as a switch to close an electric circuit when the pendulum is vibrated, and means comprising an electromagnet located adjacent the weight on the pendulum for moving the pendulum from normal position and for suddenly releasing it whereby it will be permitted to swing and alternately make and break the electrical connection between the contacts.

CHARLES W. CLARK.
RICHARD RUPERT.